(12) United States Patent
Axelsson (10) Patent No.: US 10,684,359 B2
(45) Date of Patent: Jun. 16, 2020

(54) LONG RANGE LIDAR SYSTEM AND METHOD FOR COMPENSATING THE EFFECT OF SCANNER MOTION

(71) Applicant: LEICA GEOSYSTEMS AG, Heerbrugg (CH)

(72) Inventor: Andreas Axelsson, Bankeryd (SE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 427 days.

(21) Appl. No.: 15/635,150

(22) Filed: Jun. 27, 2017

(65) Prior Publication Data

US 2017/0371029 A1    Dec. 28, 2017

(30) Foreign Application Priority Data

Jun. 28, 2016  (EP) .................................... 16176723

(51) Int. Cl.
*G01S 7/48*    (2006.01)
*G01S 7/481*   (2006.01)
(Continued)

(52) U.S. Cl.
CPC .......... *G01S 7/4817* (2013.01); *G01S 7/4812* (2013.01); *G01S 7/4816* (2013.01); *G01S 7/4865* (2013.01);
(Continued)

(58) Field of Classification Search
USPC ...................................................... 356/5.01
See application file for complete search history.

(56) References Cited

U.S. PATENT DOCUMENTS 4,311,385 A    1/1982  Keene
4,528,525 A *  7/1985  Eden .................... G01S 7/4812
                                                        356/139.08
(Continued)

FOREIGN PATENT DOCUMENTS

EP    0 173 617 A1    3/1986
EP    2 065 724 A2    6/2009
EP    2 884 306 A1    6/2015

OTHER PUBLICATIONS

Extended European Search Report dated Oct. 4, 2016 as received in Application No. 16176723.1.

*Primary Examiner* — James R Hulka
(74) *Attorney, Agent, or Firm* — Maschoff Brennan (57) ABSTRACT

A system for compensating for an angle difference between outgoing and incoming beams of a scanner in a long range LiDAR surface scan, the angle difference being dependent of the flight travel time of the beam and of a movement of a deflection unit of the scanner. The scanner consists of a transmitter unit emitting laser pulses, a movable deflection unit directing the laser pulses towards a target surface according to a given scan pattern, a receiver unit, comprising of receiving optics and a photo-sensitive time-of-flight sensor, and a control unit. The receiver unit comprises an active device for compensating for the angle difference between outgoing and incoming laser pulses and the control unit actuates the active device of the receiver unit and calculates a predicted angle difference between outgoing and incoming laser pulses based on a prediction of the time difference between the outgoing and incoming laser pulses.

15 Claims, 10 Drawing Sheets

(51) Int. Cl.
*G01S 7/497* (2006.01)
*G01S 17/42* (2006.01)
*G01S 7/4865* (2020.01)

(52) U.S. Cl.
CPC ............ *G01S 7/497* (2013.01); *G01S 7/4972* (2013.01); *G01S 17/42* (2013.01)

(56) References Cited

U.S. PATENT DOCUMENTS

| | | | | |
|---|---|---|---|---|
| 4,810,088 | A * | 3/1989 | Karning | F41G 3/065 250/342 |
| 6,147,747 | A * | 11/2000 | Kavaya | G01B 11/26 356/141.1 |
| 7,746,449 | B2 * | 6/2010 | Ray | G01S 7/4812 356/5.01 |
| 8,928,881 | B2 * | 1/2015 | Swalwell | G01N 15/1434 356/336 |
| 10,082,667 | B2 * | 9/2018 | Truscott | G01S 7/4817 |
| 2009/0123158 | A1 * | 5/2009 | Ray | G01S 7/4812 398/140 |
| 2011/0267604 | A1 * | 11/2011 | Swalwell | G01N 15/1434 356/152.1 |
| 2016/0327785 | A1 * | 11/2016 | Truscott | G01S 17/89 |

* cited by examiner

LONG RANGE LIDAR SYSTEM AND METHOD FOR COMPENSATING THE EFFECT OF SCANNER MOTION

FIELD OF THE INVENTION

The present invention relates to a long range LiDAR system. More particularly, the present invention relates to a method of solving or mitigating the effect of an angle difference between outgoing and incoming beam caused by the motion of a deflection element of a scanner in a laser system and the flight travel time of the beam between the instant of light being transmitted and the instant of receiving the resulting return from the target.

BACKGROUND

In a long range LiDAR system short laser pulses are transmitted and directed towards a target surface according to a defined scan pattern using movable mirrors or refractive optics. In particular in an airborne LiDAR system the distance to the ground, i.e. the target surface, can be significant (up to 5 km) and the scanning rate of the scan pattern (typical 200-300 rad/s) quite high. This results in that the position of the moving optics, e.g. a sweeping mirror or a refractive scan unit, changes between when the light is directed towards the ground just after pulse transmission, and when it is redirected into the receiver optics when it returns after the reflection on the ground.

The round trip time for a pulse travelling at the speed of light (approx 300 000 km/s) at a ground distance of 5 km is 33 µs. If the scanner has a scan rate of 200 rad/s this results in a pointing difference of 6.6 mrad. This results in that the receiver will look 6.6 mrad away from where the laser beam hits the ground. A typical laser beam will have a beam size of typical 0.2-0.5 mrad. Thus to be able to collect the returning light, the field of view of the receiver has to be 10-20 times the size of the laser beam.

If the scanner can move the beam in complex patterns (2D) this displacement will occur on all sides of the laser beam, thus even double this field of view requirement on the receiver.

In addition to the angle deviation caused by the motion of the deflection element of the scanner, a further angle deviation between outgoing and incoming beam occurs along the flight path and is caused by the motion of the LiDAR carrier, e.g. an airplane, over the ground. However, this deviation is usually several magnitudes smaller and thus negligible for most applications.

Assuming again a round trip time of 33 µs, for a pulse travelling at the speed of light at a ground distance of 5 km, the deviation between transmitted and received beams along the flight path of an airplane travelling at a ground speed of 600 km/h is approximately 0.001 mrad, which is almost four orders of magnitude smaller than the deviation caused by the motion of the deflection unit of the scanner.

In terrestrial applications of long range LiDAR systems, e.g. in the field of construction monitoring or slope monitoring, typical measurement distances are shorter compared to the distances in common aerial applications. However, the scanning rate of the scan pattern might be higher, e.g. thanks to improved mechanical stabilization or because improved 3D models for the target surface are already available for fine tuning of the scan pattern. This fast scanning rate results in the same effect as described above for aerial applications, i.e. an angle difference between outgoing and incoming beam caused by the finite flight travel time of the beam and the fast movement of the deflection unit of the scanner between transmission and return.

For some special cases such as rectilinear scanning in one direction at a constant range, the angle difference between outgoing and incoming beam is compensated by statically displacing the receiver at the deflected focus. However, for scanning in two directions, e.g. using a circular scan pattern, and/or scanning at varying range this solution is technically not realizable or at least strongly limited.

The required large field of view of the receiver being 10-20 times the size of the laser beam has several drawbacks. For example, the solar background noise is strongly increased and limits the detection threshold for weak return pulse signals. Thus the transmission power needs to be increased for achieving a sufficient signal to noise ratio (S/N). Typically, the readout time of a detector depends on the size of the detector. Thus, the readout time of larger detectors is increased, i.e. limiting the overall scanning speed and/or the scanning resolution, and the detector bandwidth is typically reduced.

SUMMARY

It is therefore an object of the present invention to provide a method and an improved system for a long range LiDAR scanner, in particular an aerial LiDAR scanner.

Some embodiments of the present invention provide a method and system for a long range LiDAR scanner having improved S/N characteristics, a faster scanning speed, and an improved scanning resolution.

Embodiments of the present invention provide a method for a long range LiDAR scanner to reduce the technical outlay for the sensor electronics and to provide a faster readout, as well as reduced costs.

At least one of these improvements is achieved by the method of claim 1, the system of claim 8, and/or the dependent claims of the present invention.

According to the invention the angle difference between outgoing and incoming beam caused by the time difference and a fast motion of the deflection unit of the scanner is compensated by having an active device in the receiver optics that dynamically counter-deflects the returning light in front of the receiver. Knowing the scan pattern, and the time difference, this counter-deflection pattern can be calculated.

Using such a dynamic compensation, the receiver can be much better aligned with the transmitter even though the deflection unit of the scanner has significant movement during the time of flight. Therefore, the field of view of the receiver can be much smaller, e.g. comparable to the size of the laser beam, and thus much smaller detectors can be used, i.e. enabling faster readout, higher bandwidth, and higher S/N, in particular thanks to reduced solar background noise.

Therefore, the invention relates to a method for compensating an angle difference between outgoing and incoming beam of a scanner in a long range LiDAR surface scan, wherein the angle difference being dependent of the flight travel time of the beam and of a movement of a deflection unit of the scanner. The scanner consists of a transmitter unit emitting laser pulses, a movable deflection unit, in particular comprising one or more sweeping mirrors (e.g. a Galvo-scanner) or a refractive scan unit (e.g. a wedge scanner), directing the laser pulses towards a target surface according to a given scan pattern, a receiver unit, comprising of receiving optics and a photo-sensitive time-of-flight sensor, and a control and processing unit. The method is characterized in that the receiver unit comprises an active device, being adapted for compensating for the angle difference occurring between outgoing and incoming laser pulses, wherein the control and processing unit being adapted for calculating a predicted angle difference between outgoing and incoming laser pulses, based on a prediction of the time difference between outgoing and incoming laser pulses, and being adapted for actuating the active device of the receiver unit based on the predicted angle difference.

In particular, the angle difference between outgoing and incoming beam is predicted based on at least one of the relative distance between the scanner and the target surface, a scan pattern of the scanner, a scan rate of the scanner, a known digital 3D model of the target surface, and a proper motion, in particular the speed, of the scanner. Depending on the application, using one or a particular combination of these means might be advantageous, e.g. for improving the accuracy for the calculation of the predicted angle difference, for minimizing calculation overhead time, or simply for redundancy and monitoring purposes.

In a further embodiment, the relative distance between the scanner and the target surface is determined as a function of measured data of at least one of a generic distance measurement device, particularly a radar device and/or an altimeter, a satellite navigation system, and a known digital 3D model of the target surface.

The angle difference between outgoing and incoming beam may further be predicted as a function of at least one of a yaw angle, a longitudinal inclination angle, and a transverse inclination angle of the scanner, in particular current at the respective pulse sending and/or receiving time.

Particularly for simplifying technical outlay or for continuous monitoring and immediate adjustments, in a particular embodiment the angle difference between outgoing and incoming beam is continuously predicted, based on a continuous trend assumption of the so far applied angle corrections, in particular as a function of the last three angle corrections that have been applied.

According to some embodiments of the invention, the active device of the receiver unit may comprise of at least one of a movable Risley prism, a galvo-mirror, a fast steering mirror, a liquid lens, a rotating glass plate, a movable wedge prism, and a linear translation unit for the photo-sensitive time-of-flight sensor. Each of these components or combinations have their own advantages or disadvantages, e.g. in view of reaction time, component size, and thus cost, depending on their location before or after the movable deflection device of the transmitter, i.e. depending on the beam size and/or depending on being in a collimated or converging beam, as well as electronic or opto-mechanical outlay.

In some embodiments the movable deflection unit comprises of a first deflection element for directing the laser pulse towards the target surface and a second deflection element for directing the incoming laser pulse towards the photo-sensitive time-of-flight sensor, wherein the first and second deflection element are integrated into one single movable component, in particular wherein the first and second deflection elements are adapted for being used in an optically co-axial or parallel setup for the outgoing and incoming laser pulses. For example, this embodiment particularly reduces mechanical outlay and might be advantageous regarding calibration and maintenance of the scanner. In particular, the first and second deflection elements may be built as one movable deflection mirror, e.g. wherein the same area of the mirror being used for deflecting the outgoing and incoming beam or wherein separate areas on the mirror surface being used for the two beams. The first and second deflection elements may also be integrated as parts of a sweeping mirror wedge. For example, such an embodiment might have advantages regarding internal stray light, heat management, or mechanical setup. In particular, different exit and entry optics might be used for the transmission and for the receiver channels, e.g. for reducing stray light and/or being equipped with different filter optics.

Furthermore, some embodiments of the invention describe a long range LiDAR system for taking scans of a target surface, being adapted for compensating the angle difference between outgoing and incoming beam of a scanner, caused by the flight travel time of the beam and of a movement of a deflection unit of the scanner. The scanner consists of a transmitter unit emitting laser pulses, a movable deflection unit, in particular comprising one or more sweeping mirrors (e.g. a Galvo scanner) or a refractive scan element (e.g. a wedge scanner), directing the laser pulses towards the target surface according to a given scan pattern, a receiver unit, comprising of receiving optics and a photo-sensitive time-of-flight sensor, and a control and processing unit. The receiver unit comprises an active device, being adapted for compensating for the angle difference occurring between outgoing and incoming laser pulses, and the control and processing unit being adapted for calculating a predicted angle difference between outgoing and incoming laser pulses, based on a prediction of the time difference between outgoing and incoming laser pulses, and being adapted for actuating the active device of the receiver unit based on the predicted angle difference.

In another embodiment of the long range LiDAR system the control and processing unit calculates the predicted angle difference between outgoing and incoming beam based on data assigned to it, the data comprising of at least one of the relative distance between the scanner and the target surface, a measurement of a satellite navigation system, a scan pattern of the scanner, a scan rate of the scanner, a known digital 3D model of the target surface, and a proper motion, in particular the speed, of the scanner.

In one embodiment of the long range LiDAR system the relative distance between the scanner and the target surface is calculated by the control and processing unit based on data assigned to the control and processing unit, comprising at least one of a generic distance measurement device, particularly a radar device and/or an altimeter, a satellite navigation system, and a known digital 3D model of the target surface.

The angle difference between outgoing and incoming beam may further be predicted as a function of at least one of a yaw angle, a longitudinal inclination angle, and a transverse inclination angle of the scanner of the long range LiDAR system, in particular current at the respective pulse sending and/or receiving time.

Particularly for simplifying technical outlay or for continuous monitoring and immediate adjustments, in a particular embodiment of the long range LiDAR system the predicted angle difference between outgoing and incoming beam is continuously calculated by the control and processing unit, based on a continuous trend assumption of the so far applied angle corrections, in particular as a function of the last three angle corrections that have been applied.

According some embodiments of the invention, the active device of the receiver unit of the long range LiDAR system might comprise of at least one of a movable Risley prism, a galvo-mirror, a fast steering mirror, a liquid lens, a rotating glass plate, a movable wedge prism, and a linear translation unit for the photo-sensitive time-of-flight sensor.

In one embodiment of the long range LiDAR system the movable deflection unit comprises of a first deflection element for directing the laser pulse towards the target surface and a second deflection element for directing the incoming laser pulse towards the photo-sensitive time-of-flight sensor, wherein the first and second deflection element are integrated into one single movable component, in particular wherein the first and second deflection elements are adapted for being used in an optically co-axial or parallel setup for the outgoing and incoming laser pulses.

Some embodiments further disclose a computer program product that is stored on a machine readable carrier, in particular for execution in a control and processing unit of a long range LiDAR system according to the invention, with program code for carrying out at least the step of determining a predicted angle difference between outgoing and incoming beam as a function of at least one of the time difference between outgoing and incoming laser pulses, particularly wherein the time difference being represented by a relative distance between the scanner and the target surface, a scan pattern, a scan rate of the scanner, a proper motion, in particular the speed, of the scanner, and a continuous trend assumption for the so far corrected angle differences.

DETAILED DESCRIPTION

In the following, the invention will be described in detail by referring to exemplary embodiments that are accompanied by figures, in which.

DETAILED DESCRIPTION OF THE INVENTION

Figure 1A:
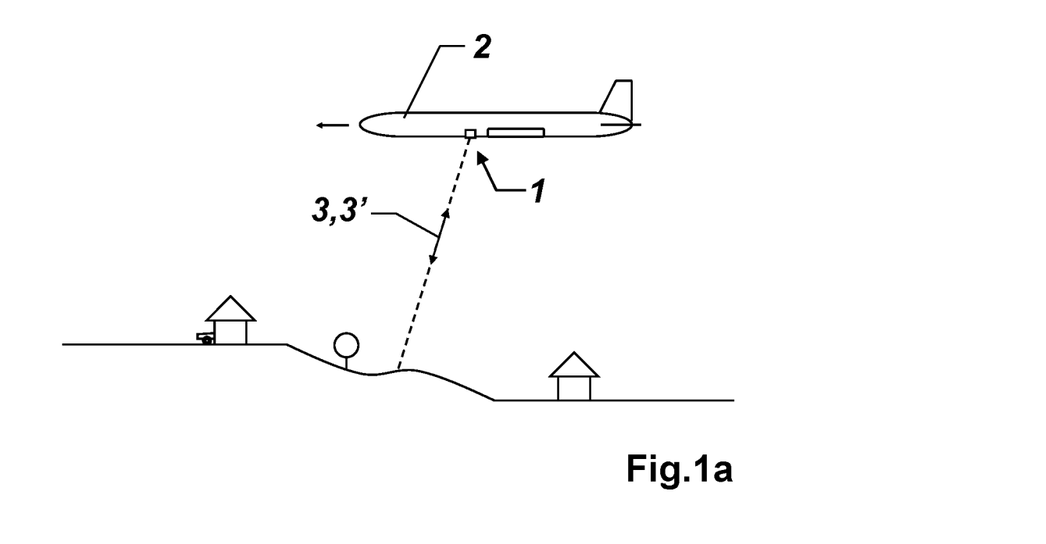
FIG. 1a,b: an exemplary measuring task for an airborne (a) and for a terrestrial (b) long range LiDAR measuring system.

FIG. 1a shows a typical airborne surface scan of a long range LiDAR-system 1 on board of an airborne carrier 2, e.g. an airplane. Short laser pulses are transmitted and directed towards the ground according to a defined scan pattern using movable mirrors or refractive optics (not shown here, see FIGS. 3-6). For individual scanner orientations, i.e. pointing directions 3,3', the distance between the LiDAR system 1 and the observed surface points are mapped by means of a pulse time-of-flight method.

Figure 1B:
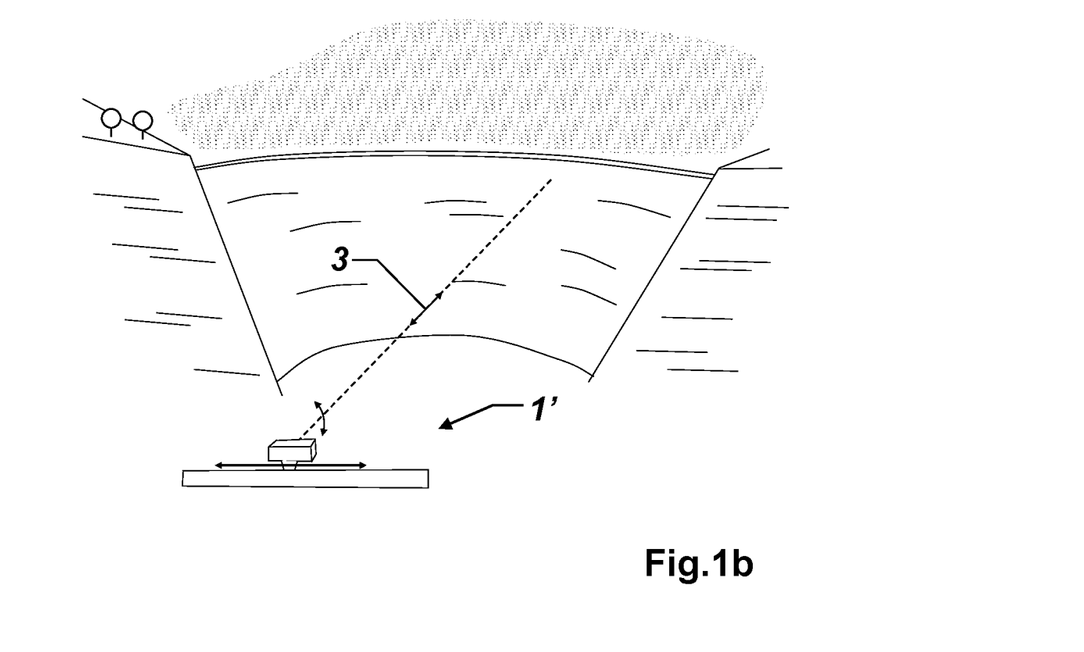

FIG. 1b shows a typical terrestrial application of a long range LiDAR system 1', here in the field of construction monitoring, e.g. for monitoring the integrity of a dam by measuring small scale movements of the dam due to the varying water pressure. In terrestrial applications typical measurement distances are shorter compared to the distances in common aerial applications. However, the scanning rate of the scan pattern might be higher, e.g. thanks to improved mechanical stability or because improved 3D models for the target surface are already available for fine tuning of the scan pattern. Short laser pulses are transmitted and directed towards the target surface, i.e. the dam, according to a defined scan pattern using a fast deflection unit, e.g. movable mirrors or refractive optics (not shown here, see FIGS. 3-6), and/or by moving the whole scanner, e.g. as shown in the figure by moving the scanner on a rail for lateral translation. Thus, fast beam steering might be used in one or two directions. For each individual scanner orientation, i.e. defined by the scanner position and the current pointing direction 3, the distance between the LiDAR system 1' and the observed surface point is determined by means of a pulse time-of-flight method.

Figure 2:
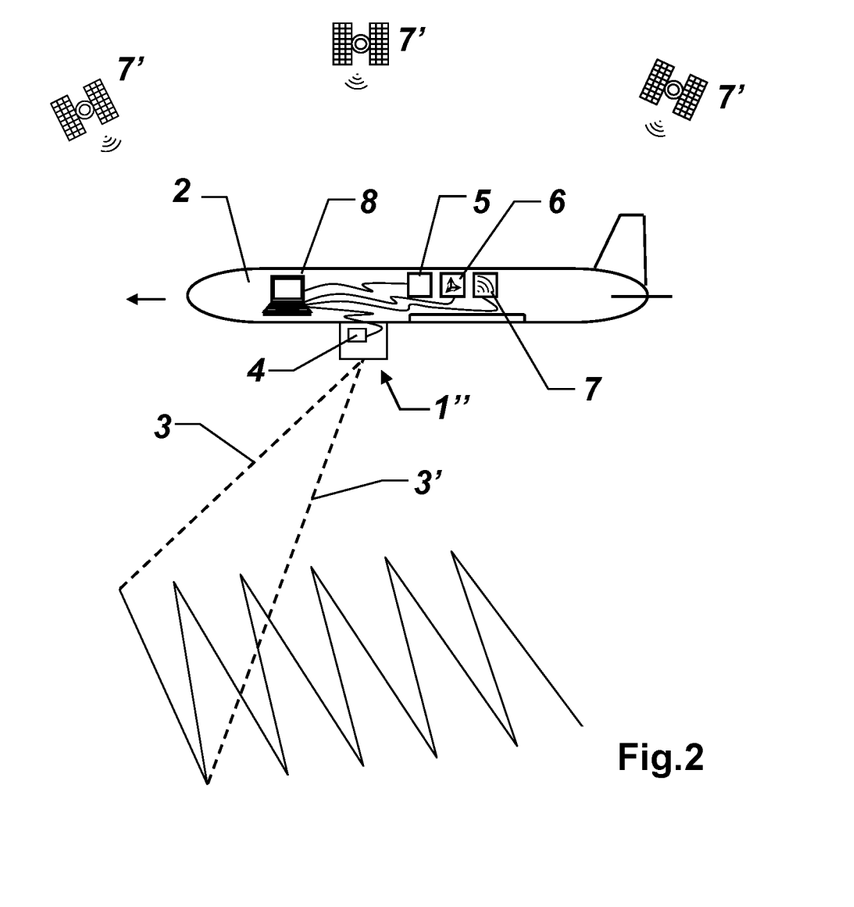
FIG. 2: an exemplary measuring task for an airborne long range LiDAR measuring system using a sweeping mirror (e.g. a Galvo scanner) producing a zig-zag scan pattern.

FIG. 2 shows a further typical embodiment of an airborne long range LiDAR system 1" making use of several additional data sources and measuring devices, particularly additional means for determining the position and orientation of the airborne carrier 2, comprising an altimeter 5, a device for determining the flight attitude 6, e.g. giving a yaw angle, a longitudinal angle, and/or a transverse inclination angle of the airplane 2, and measured data of a satellite navigation system 7,7' carried along in the flying object. Furthermore, a known digital 3D model of the overflown terrain might be stored on a central control device 8 of the airplane or on a control and processing unit 4 of the aerial LiDAR system 1". The auxiliary data might be partly processed by an external processing means, e.g. a central control device 8 of the airplane, or the data might be directly linked to a control and processing unit of the aerial LiDAR system 1", which will process the data and determine the position and the orientation of the airborne carrier and thus the position and orientation of the aerial LiDAR system 1". Eventually, the figure further shows a typical zig-zag scan pattern, caused by a sweeping scanner motion and a forward flight movement, wherein two exemplary scanner pointing directions 3,3' are indicated.

Instead of a zig-zag scan pattern other scan patterns might be used, in particular scanning with a circular scan pattern, e.g. using a rotating tilted deflection mirror or a refractive scan unit. By way of example, due to such a circular scanning by the long range LiDAR system and the forward flight movement, a spiral scan pattern is drawn onto the ground. Thanks to such a spiral scan pattern each surface point is scanned from different viewing angles and thus shadow effects are greatly minimized, wherein a large area can be scanned.

Figure 3:
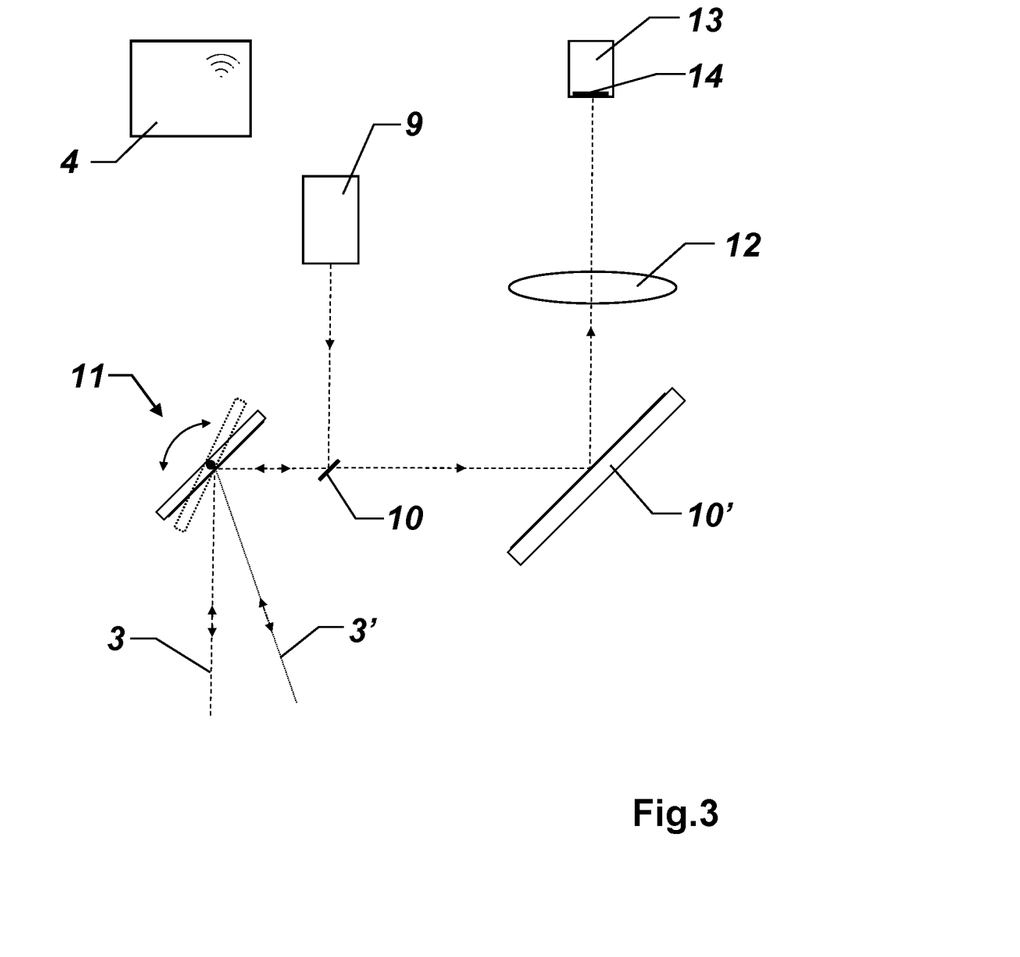
FIG. 3: a schematic illustration of a long range LiDAR system showing an idealized light path with a sweeping mirror.

FIG. 3 shows a schematic illustration of a long range LiDAR system with an idealized optical path comprising of a control and processing unit 4, a transmission channel with a laser transmitter 9 coupled into a common transmission/receiver channel by a first stationary deflection mirror 10, a sweeping mirror 11 in the common transmission/receiver channel, and a receiver channel with a second stationary deflection mirror 10', focusing optics 12, and a LiDAR receiver 13 with a photosensitive receiver area 14. The optical path for a current scan direction 3 is indicated, as well as a second optical path corresponding to another scan direction 3', i.e. triggered by a different orientation of the sweeping mirror. For the same orientation of the sweeping mirror both for transmission and reception of corresponding light pulses, the receiving optical path between LiDAR sensor 13 and sweeping mirror 11 remains stable and is the same for different orientations of the sweeping mirror 11.

However, since the distance to the target surface can be significant (e.g. up to 5 km for an aerial scan) and the scanning rate of the scan pattern, e.g. the movement of a sweeping mirror 11, can be quite fast (typical 200-300 rad/s) the orientation of the sweeping mirror 11 changes between when the light is directed towards the target surface just after pulse transmission, and when it is redirected into the receiver optics when it returns after the reflection on the target surface.

The round trip time for a pulse travelling at the speed of light (approx 300 000 km/s) at a target distance of 5 km is 33 µs. If the scanner has a scan rate of 200 rad/s this results in a pointing difference of 6.6 mrad. This results in that the receiver 13 will look 6.6 mrad away from where the laser beam hits the target surface. A typical laser beam will have a beam size of typical 0.2-0.5 mrad. Thus to be able to collect the returning light, the field of view of the receiver has to be 10-20 times the size of the laser beam.

If the scanner can move the beam in complex patterns (2D) this displacement will occur on all sides of the laser beam, thus even double this field of view requirement on the receiver.

Figure 4:
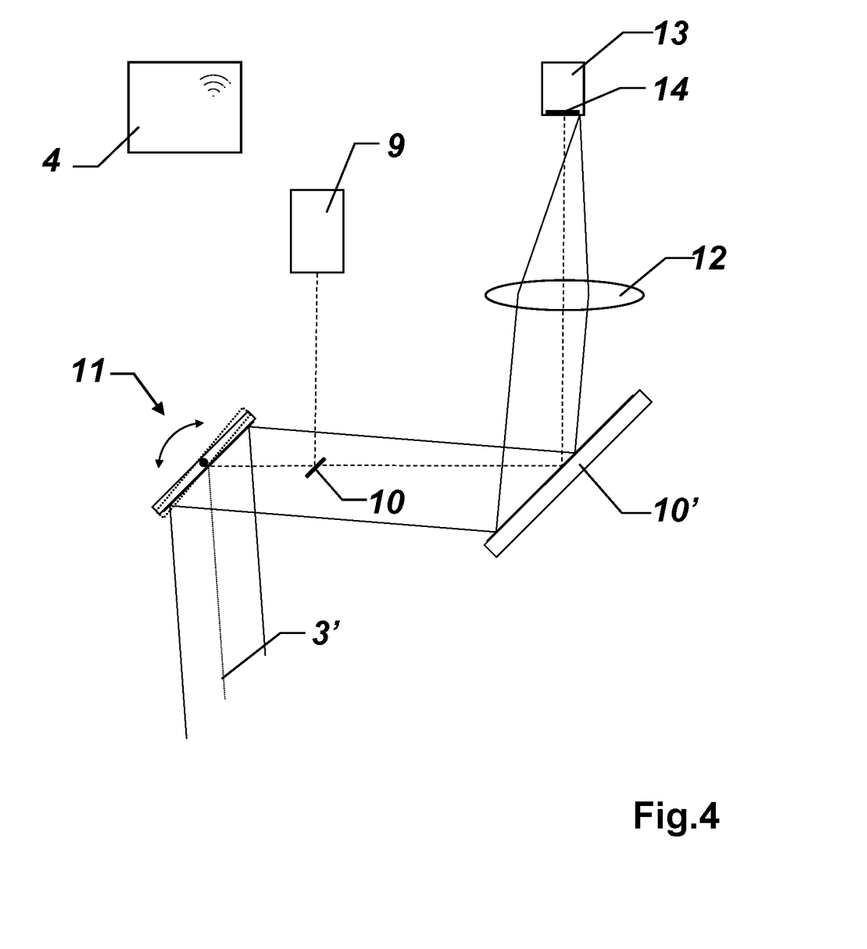
FIG. 4: an exemplary light path in a long range LiDAR system with a sweeping mirror and an angle difference occurring between outgoing and incoming beam caused by the flight travel time of the beam and a motion of the sweeping mirror.

An exemplary case of such a situation with an angle difference between outgoing and incoming beam due to the flight travel time of a laser pulse and a fast movement of a sweeping mirror 11 is indicated by FIG. 4, where the current (receiving) orientation of the sweeping mirror 11 has changed significantly since transmission towards a first pointing direction 3' and now corresponds to a second, significantly different, pointing direction. Therefore, the receiving optical path downstream of the sweeping mirror 11, i.e. towards the LiDAR sensor 13, significantly deviates from the stationary situation corresponding to a consistent transmission and receiving orientation of the sweeping mirror 11. Thus, the returning laser beam won't be well centered on the photosensitive receiving area 14 of the LiDAR receiver 13 anymore, or it might even partly or fully miss the LiDAR receiver 13.

According to the invention, the angle difference between outgoing and incoming beam caused by the time difference is compensated by having an active device in the receiver optics that dynamically counter-deflects the returning light in front of the receiver. Knowing the scan pattern, and the time difference, this counter-deflection pattern can be calculated. Using such a dynamic compensation, the receiver 13 can be much better aligned with the transmitter 9 even though the scanning element, e.g. the sweeping mirror 11, has significant movement during the time of flight. Therefore, the field of view of the receiver is comparable to the size of the laser beam, and thus much smaller detectors can be used, i.e. enabling faster readout, higher bandwidth, and higher S/N, in particular thanks to reduced solar background noise.

FIGS. 5a to 5e indicate exemplary embodiments of the invention implementing different kinds of active devices at different positions in the receiving beam to dynamically compensate the angle difference between outgoing and incoming beam of a long range LiDAR system 1,1',1".

The active device of the receiver unit may comprise of at least one of a Risley prism, a galvo-mirror, a fast steering mirror, a liquid lens, a rotating glass plate, a wedge prism, and a linear translation unit for the photo-sensitive time-of-flight sensor 13. Each of these components or combinations has its own advantages or disadvantages, e.g. in view of reaction time, component size, and thus cost, depending on their location before or after the movable deflection device of the transmitter, i.e. depending on the beam size and/or depending on being in a collimated or divergent beam, as well as electronic or opto-mechanical outlay.

Figure 5A:
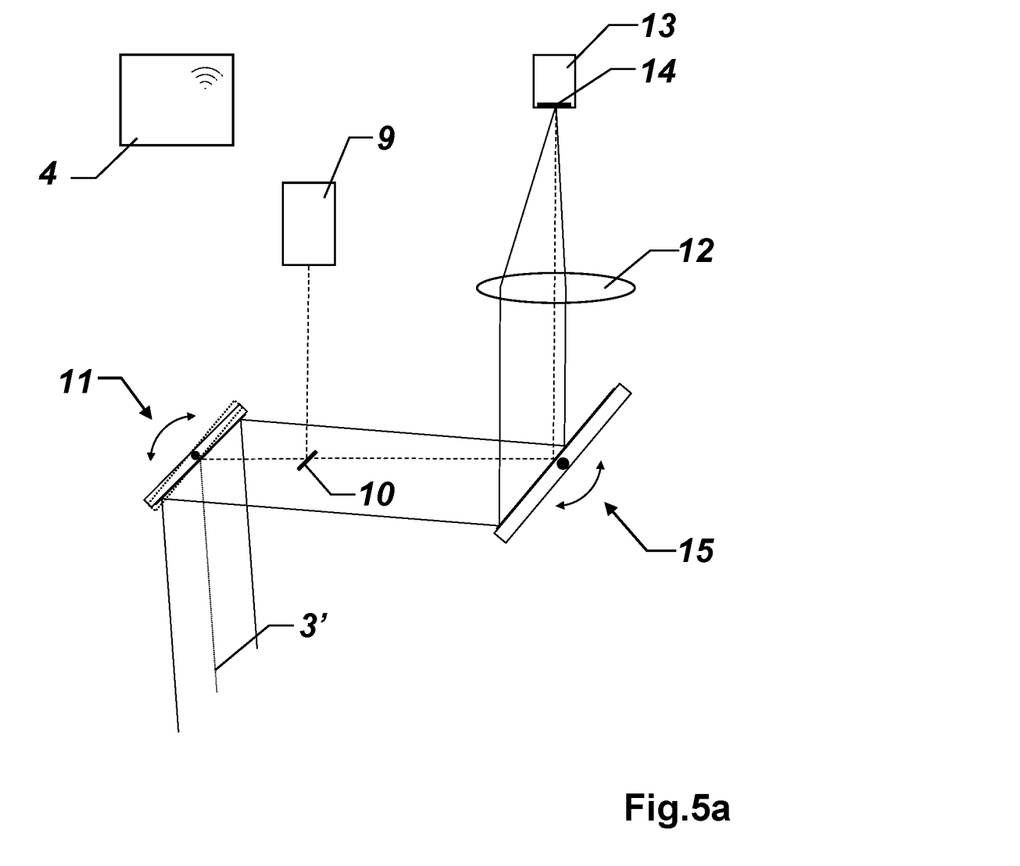
FIG. 5a-e: exemplary embodiments of a long range LiDAR system according to the invention with the laser transmitter coupled into a common transmission/receiving light channel, wherein a sweeping mirror is used and compensation of the angle difference between outgoing and incoming beam is indicated by means of another sweeping mirror (a), a liquid lens (b), a rotating glass plate (c), a sliding wedge prism (d), or a pair of Risley prisms (e)

FIG. 5a shows an embodiment making use of a second movable mirror 15 in the collimated beam of the receiving channel, replacing the stationary deflection mirror 10' of the receiving channel (see FIG. 3). This second sweeping mirror, which is usually bigger than the first sweeping mirror 11 to minimize vignetting effects, is controlled by the control and processing unit 4 of the long range LiDAR system and corrects for the angle difference between outgoing and incoming beam caused by the flight travel time of the beam and of the movement of the first sweeping mirror 11. This embodiment is particularly well suited for correcting an angle difference along one direction, i.e. a one-directional scan pattern. Even for reasonably large mirrors the mounting and rotation device can be built in a sufficiently compact manner without a complicated mechanical device structure and thus the reaction rate of the mirror movement can still be high enough to comply with the scanning movement. However, for more complex scanning patterns, in particular scanning movements along two axis, fast and accurate movements of large mirror devices might be mechanically cumbersome and also space consuming.

Figure 5B:
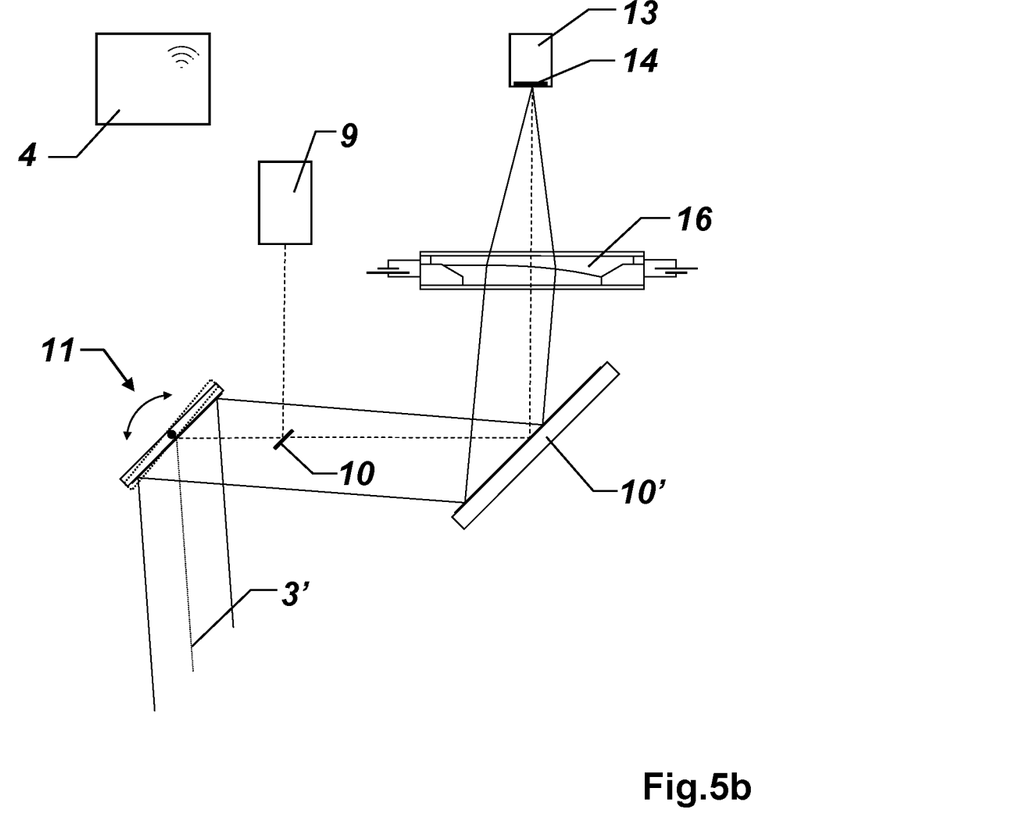

FIG. 5b shows an embodiment making use of a liquid lens 16 as part of the focusing optics, which embodiment is particularly well suited for compensation of angle differences between outgoing and incoming beam occurring for more complex scan patterns, in particular scan patterns along two directions. The liquid lens 16 is controlled by the control and processing unit 4 of the long range LiDAR system and corrects for the angle difference between outgoing and incoming beam caused by the flight travel time of the beam and of the movement of the first sweeping mirror 11.

A liquid lens 16 comprises of an element having an optically transparent liquid, which has at least one interface towards a medium having an optical index of refraction deviating from the liquid. The interface is deformable by means of multiple electrical activation signals in such a manner that the optical refraction properties of the element are thus differently variable in at least two non-coincident directions.

In particular, the interface is deformable in such a manner that the optical refraction properties of the element are thus variable in three dimensions, namely longitudinally and in two directions transverse to the beam direction. For example, a curvature of the interface might be variably settable in that the lens is uniformly activated or the curvatures of the interface might be varied differently in at least two non-coincident directions. Furthermore, the centers of curvature might be displaced differently in at least two non-coincident directions. This results in a modifiability of the beam path in the receiving unit of the long range LiDAR system in manifold ways.

The activation of a liquid lens permits the lens to be deformed in a controlled manner, whereas the entire liquid lens as an optical element is not shifted in its position or alignment in the device, however, but rather is fixedly installed. Therefore, the mechanical device structure is not complicated, but rather in contrast—in comparison to a possible implementation of the same functionalities using other means—might even be simplified and the number of required components is also less.

Figure 5C:
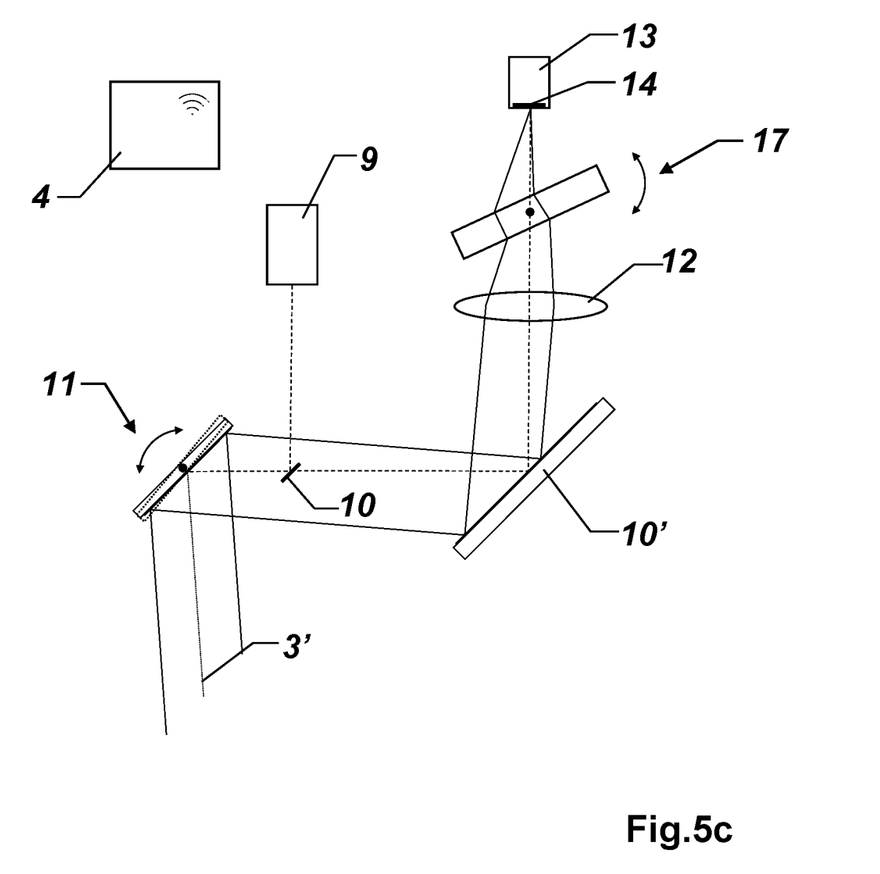

FIG. 5c shows an embodiment of the invention making use of a tiltable parallel glass plate 17 of a defined thickness placed in the converging beam of the receiving channel. The tiltable glass plate 17 is controlled by the control and processing unit 4 of the long range LiDAR system and corrects for the angle difference between outgoing and incoming beam caused by the flight travel time of the beam and of the movement of the first sweeping mirror 11.

When a converging beam passes through a tilted glass plate the image will be displaced laterally, depending on the thickness of the parallel glass plate, its refractive index, and the tilt angle.

Similar than the embodiment given by FIG. 5a with the second sweeping mirror, given the mechanical structure and the simplicity of the optical device, this embodiment is particularly well suited for correcting an angle difference along one direction, i.e. a one-directional scan pattern. Furthermore, being in the converging beam, the diameter of the glass plate 17 can be smaller than the diameter of optical devices being placed in the collimated beam section of the receiver unit, and thus the overall space requirements might be optimized.

Figure 5D:
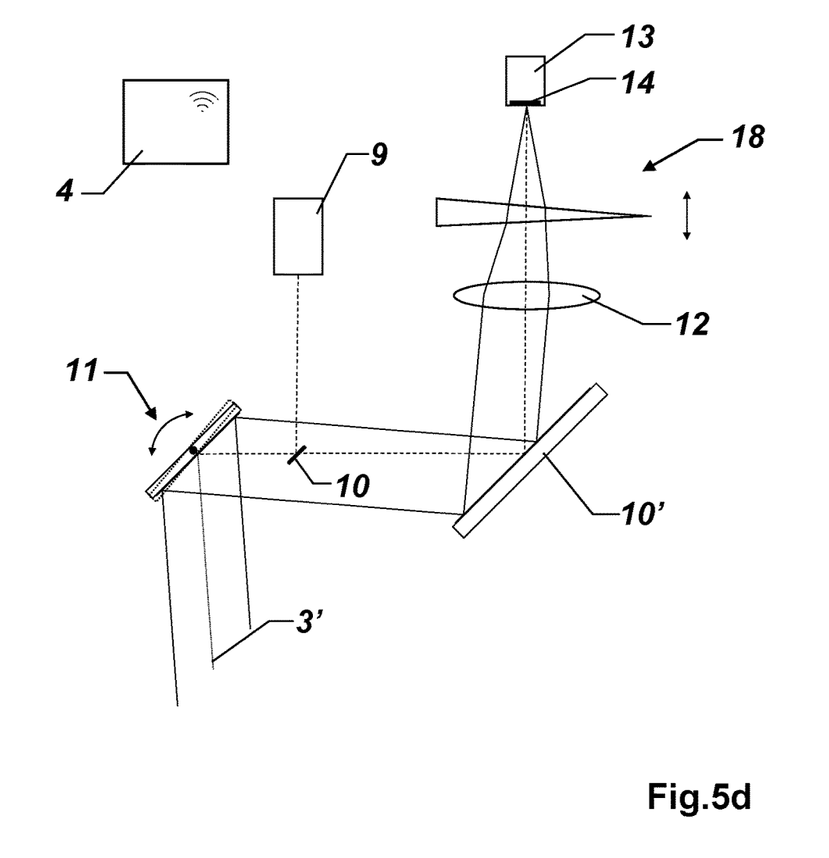

FIG. 5d shows a further embodiment according to the invention making use of a glass wedge 18 in the converging beam of the receiving channel, which is moveable along the converging beam between the focusing optics 12 and the LiDAR sensor 13. The movable glass wedge 18 is controlled by the control and processing unit 4 of the long range LiDAR system and corrects for the angle difference between outgoing and incoming beam caused by the flight travel time of the beam and of the movement of the first sweeping mirror 11.

The glass wedge 18 introduces a lateral image displacement in the focal plane, depending on its refractive index, the wedge angle, and the distance to the LiDAR sensor 13, which diminishes in a linear manner as the wedge is moved along from the focusing optics 12 to the LiDAR sensor 13.

A linear translational movement instead of a rotational or tiltable option as indicated in the embodiments above might be favorable in some cases, e.g. for stability reasons or for simplifying the mechanical structure. However, also this embodiment is only capable of compensating for an initial angle difference along one direction, i.e. a one-directional scan pattern.

Figure 5E:
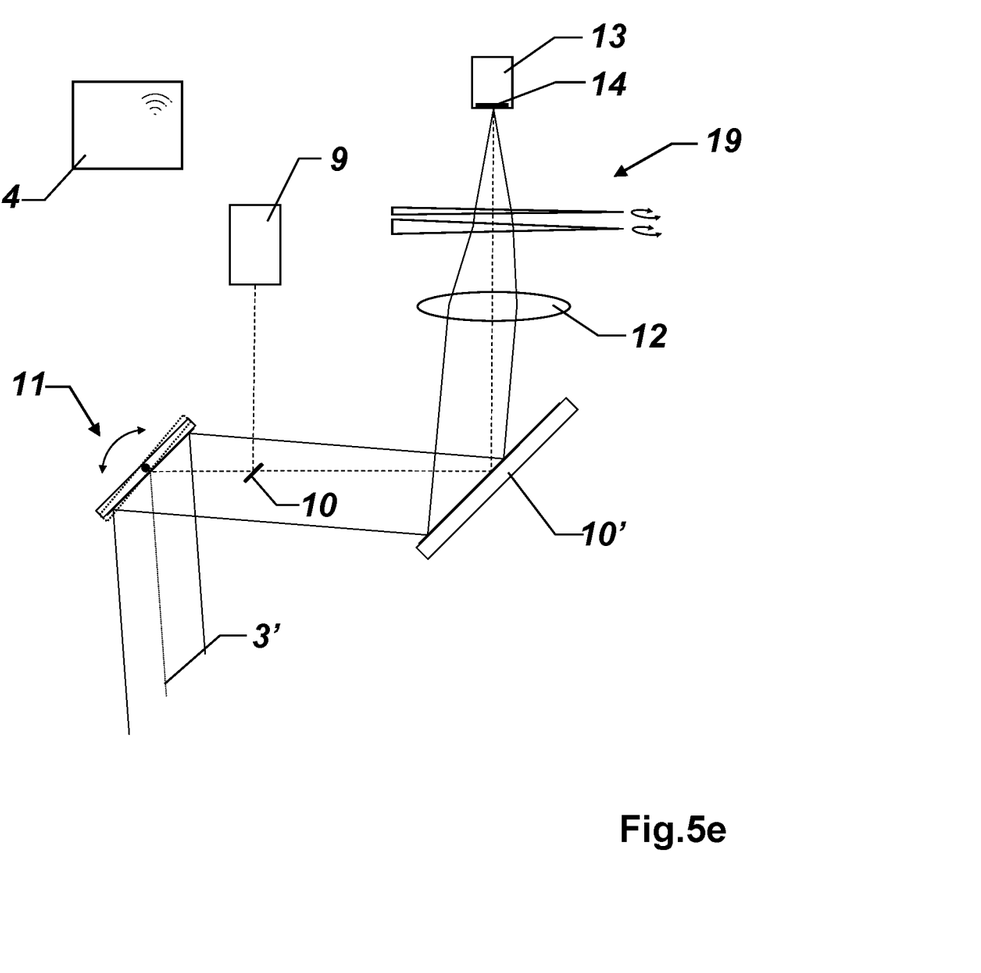

Another embodiment of the invention, capable of also compensating for a two-dimensional scan pattern is shown in FIG. 5e, comprising of two rotating wedge prisms, i.e. a pair of Risley prisms 19, placed in the converging beam of the receiving channel. Wedge prisms and combinations thereof are well known for laser beam steering applications and are also ideal for compact setups and comply well with the reaction rates required for a LiDAR system according to the invention.

Depending on their refractive index, their wedge angle, and their position along the converging beam, each individual rotating wedge prism displaces an image on a circle of a given displacement radius. By controlling the rotation angle of each prism independently, the image is displaced by any point within a given circle.

The pair of Risley prisms 19 is controlled by the control and processing unit 4 of the long range LiDAR system and corrects for the angle difference between outgoing and incoming beam caused by the flight travel time of the beam and of the movement of the first sweeping mirror 11.

Figure 6:
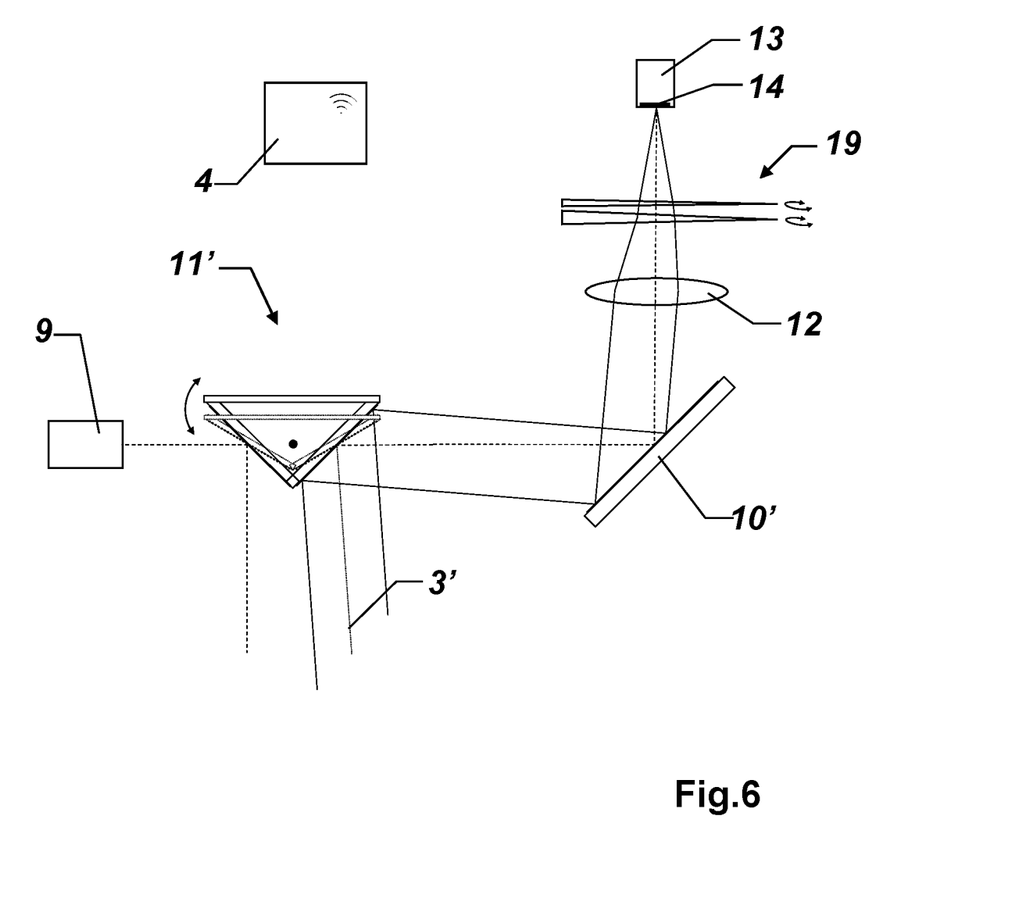
FIG. 6: exemplary embodiment of a long range LiDAR system according to the invention with the laser transmitter being decoupled from the receiving light channel, wherein a sweeping mirror wedge is used for deflecting the laser beam towards the target surface.

FIG. 6 shows another exemplary embodiment wherein the transmission light channel with the laser transmitter 9 is decoupled from the receiving light channel. Here, instead of a sweeping mirror 11 a sweeping mirror wedge 11' is used for deflecting the laser beam towards the target surface. Such an embodiment might have advantages regarding internal stray light, heat management, or mechanical setup. In particular, different exit and entry optics might be used for the transmission and for the receiver channels, e.g. for reducing stray light and/or being equipped with different filter optics.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A method for compensating for an angle difference between an outgoing beam and an incoming beam of a scanner in a long range LiDAR surface scan, wherein the angle difference is dependent of the flight travel time of the outgoing beam and of a movement of a deflection unit of the scanner, the method comprising:
   emitting laser pulses from a transmitter unit;
   directing the laser pulses towards a target surface according to a given scan pattern using a movable deflection unit;
   receiving an incoming laser pulse using a receiver unit consisting of a receiver optic and a photo-sensitive time-of-flight sensor;
   compensating for the angle difference occurring between outgoing and incoming laser pulses using an active device of the receiver unit, the active device being adapted for deflecting incoming laser pulses to compensate for the angle difference;
   calculating a predicted angle difference between outgoing and incoming laser pulses, based on a prediction of the time difference between the outgoing and incoming laser pulses using a control and processing unit; and
   actuating the active device of the receiver unit based on the predicted angle difference.

2. The method as claimed in claim 1, wherein the angle difference between outgoing and incoming beam are predicted based on at least one of:
   a relative distance between the scanner and the target surface,
   a scan pattern of the scanner,
   a scan rate of the scanner,
   a known digital 3D model of the target surface, and
   a proper motion, in particular the speed, of the scanner.

3. The method as claimed in claim 2, wherein the relative distance between the scanner and the target surface is determined as a function of measured data of at least one of:
   a generic distance measurement device,
   a satellite navigation system, and
   a known digital 3D model of the target surface.

4. The method according to claim 1, wherein the angle difference between outgoing and incoming beam being respectively predicted as a function of at least one of:
   a yaw angle of the scanner,
   a longitudinal inclination angle of the scanner, and
   a transverse inclination angle of the scanner.

5. The method according to claim 1, wherein the angle difference between outgoing and incoming beam being continuously predicted, based on a continuous trend assumption of the so far applied angle corrections.

6. The method according to claim 1, wherein the active device of the receiver unit comprises at least one of:
- a movable Risley prism,
- a galvo-mirror,
- a fast steering mirror,
- a liquid lens,
- a rotating glass plate,
- a movable wedge prism, and
- a linear translation unit for the photo-sensitive time-of-flight sensor.

7. The method according to claim 1, wherein the movable deflection unit comprises:
- a first deflection element for directing the laser pulse towards the target surface, and
- a second deflection element for directing the incoming laser pulse towards the photo-sensitive time-of-flight sensor,
- wherein the first and second deflection element are integrated into one single movable component.

8. A computer program product that is stored on a machine readable carrier, with program code for carrying out at least the method of claim 1, so as to determine a predicted angle difference between outgoing and incoming beam as a function of at least one of:
- the time difference between outgoing and incoming laser pulses,
- a scan pattern,
- a scan rate of the scanner,
- a proper motion of the scanner, and
- a continuous trend assumption for the so far corrected angle differences.

9. A long range LiDAR system for taking scans of a target surface, being adapted for compensating an angle difference between an outgoing and an incoming beam of a scanner, the angle difference being caused by the flight travel time of the beam and of a movement of a deflection unit of the scanner, the long range LiDAR system comprising:
- a transmitter unit emitting laser pulses;
- a movable deflection unit for executing a scan pattern and directing the laser pulses towards the target surface;
- a receiver unit, comprising of receiving optics, and a photo-sensitive time-of-flight sensor, and an active device, the active device being adapted for deflecting incoming laser pulses to compensate for the angle difference occurring between outgoing and incoming laser pulses; and
- a control and processing unit, being adapted for calculating a predicted angle difference between outgoing and incoming laser pulses, based on a prediction of the time difference between outgoing and incoming laser pulses, and being adapted for actuating the active device of the receiver unit based on the predicted angle difference.

10. The long range LiDAR system of claim 9, wherein the control and processing unit predicting the angle difference between outgoing and incoming beam based on data assigned to the control and processing unit, the data comprising at least one of:
- a relative distance between the scanner and the target surface,
- a measurement of a satellite navigation system,
- a scan pattern of the scanner,
- a scan rate of the scanner,
- a known digital 3D model of the target surface, and
- a proper motion of the scanner.

11. The long range LiDAR system of claim 9, wherein the control and processing unit calculates the relative distance between the scanner and the target surface based on data assigned to the control and processing unit, the data comprising at least one of:
- a distance measurement device,
- a satellite navigation system, or
- a known digital 3D model of the target surface.

12. The long range LiDAR system of claim 9, wherein the calculation of the predicted angle difference between outgoing and incoming beam by the control and processing unit is based on at least one of:
- a yaw angle of the scanner,
- a longitudinal inclination angle of the scanner, and
- a transverse inclination angle of the scanner.

13. The long range LiDAR system of claim 9, wherein the predicted angle difference between outgoing and incoming beam are continuously calculated by the control and processing unit, based on a continuous trend assumption of the so far applied angle corrections.

14. The long range LiDAR system of claim 9, wherein the active device of the receiver unit includes of at least one of:
- a movable Risley prism,
- a galvo-mirror,
- a fast steering mirror,
- a liquid lens,
- a rotating glass plate,
- a movable wedge prism, and
- a linear translation unit for the photo-sensitive time-of-flight sensor.

15. The long range LiDAR system of claim 9, wherein the movable deflection unit includes:
- a first deflection element for directing the laser pulses towards the target surface, and
- a second deflection element for directing the incoming laser pulse towards the photo-sensitive time-of-flight sensor,
- wherein the first and second deflection element are integrated into one single movable component.

* * * * *